(12) United States Patent
Zhang et al.

(10) Patent No.: US 11,304,193 B2
(45) Date of Patent: Apr. 12, 2022

(54) METHODS AND DEVICES FOR SCRAMBLING AND DESCRAMBLING SIGNAL, AND STORAGE MEDIUM

(71) Applicant: XI'AN ZHONGXING NEW SOFTWARE CO., LTD., Shaanxi (CN)

(72) Inventors: Nan Zhang, Guangdong (CN); Yijian Chen, Guangdong (CN); Chuangxin Jiang, Guangdong (CN); YuNgok Li, Guangdong (CN); Zhaohua Lu, Guangdong (CN); Shujuan Zhang, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/764,679

(22) PCT Filed: Aug. 6, 2018

(86) PCT No.: PCT/CN2018/098937
§ 371 (c)(1),
(2) Date: May 15, 2020

(87) PCT Pub. No.: WO2019/095729
PCT Pub. Date: May 23, 2019

(65) Prior Publication Data
US 2020/0404662 A1 Dec. 24, 2020

(30) Foreign Application Priority Data

Nov. 17, 2017 (CN) .......................... 201711147202.9

(51) Int. Cl.
*H04W 72/04* (2009.01)

(52) U.S. Cl.
CPC .............................. *H04W 72/0466* (2013.01)

(58) Field of Classification Search
CPC ............. H04L 25/03006; H04L 5/0053; H04L 25/03866; H04L 25/03; H04L 5/00;
(Continued)

(56) References Cited

U.S. PATENT DOCUMENTS

| 2011/0103250 A1* | 5/2011 | Li | H04L 5/0016 370/252 |
| 2016/0081094 A1* | 3/2016 | Han | H04W 72/005 370/312 |
| 2016/0205674 A1* | 7/2016 | Zhang | H04L 27/2613 370/330 |

(Continued)

FOREIGN PATENT DOCUMENTS

| CN | 103621030 A | 3/2014 |
| CN | 104247359 A | 12/2014 |

(Continued)

OTHER PUBLICATIONS

International Search Report for the International Patent Application No. PCT/CN2018/098937, dated Sep. 12, 2018, 4 pages.
(Continued)

*Primary Examiner* — Nathan S Taylor
(74) *Attorney, Agent, or Firm* — Kacvinsky Daisak Bluni PLLC

(57) ABSTRACT

Provided are a method and apparatus for scrambling a signal, a method and apparatus for descrambling a signal, a device for scrambling or descrambling a signal, and a storage medium. The method for scrambling a signal includes: a first transmission node determining first parameters for scrambling a signal to be transmitted or a signal group to be transmitted; the first transmission node scrambling the signal or the signal group according to the first parameters; and the first transmission node sending the
(Continued)

scrambled signal or the scrambled signal group to a second transmission node, and notifying part or all of the first parameters to the second transmission node through first signaling.

17 Claims, 7 Drawing Sheets

(58) Field of Classification Search
CPC .............. H04L 27/26; H04W 72/0466; H04W 72/04; H04B 7/0413; H04B 7/06
USPC ........................................................ 370/335
See application file for complete search history.

(56) References Cited

U.S. PATENT DOCUMENTS

| | | | |
|---|---|---|---|
| 2017/0019894 A1* | 1/2017 | Nimbalker | H04W 72/0413 |
| 2017/0324502 A1* | 11/2017 | Wang | H04B 1/70712 |
| 2018/0083766 A1* | 3/2018 | Cho | H04L 7/042 |
| 2018/0131493 A1* | 5/2018 | Luo | H04L 5/0007 |
| 2018/0206214 A1* | 7/2018 | Bendlin | H04W 72/042 |
| 2018/0242324 A1* | 8/2018 | Luo | H04L 5/0044 |
| 2019/0044669 A1* | 2/2019 | Davydov | H04L 5/005 |
| 2019/0081827 A1* | 3/2019 | Ly | H04W 56/00 |
| 2019/0306820 A1* | 10/2019 | Jiang | H04W 56/00 |
| 2019/0335426 A1* | 10/2019 | Kim | H04J 11/0076 |
| 2019/0357159 A1* | 11/2019 | Pan | H04L 1/1861 |
| 2020/0099461 A1* | 3/2020 | Chen | H04L 1/00 |
| 2020/0163052 A1* | 5/2020 | Ko | H04J 11/0069 |
| 2020/0187265 A1* | 6/2020 | Luo | H04L 5/0053 |
| 2020/0213973 A1* | 7/2020 | Lee | H04W 72/0466 |
| 2020/0274750 A1* | 8/2020 | Yi | H04W 72/0453 |

FOREIGN PATENT DOCUMENTS

| | | |
|---|---|---|
| CN | 108111444 A | 6/2018 |
| JP | 2011259257 A | 12/2011 |
| JP | 2013114798 A | 6/2013 |
| JP | 2013236330 A | 11/2013 |
| JP | 2014523718 A | 9/2014 |
| KR | 101659204 B1 | 9/2016 |
| WO | 2014183296 A1 | 11/2014 |

OTHER PUBLICATIONS

Huawei et al., "On Data Channel Scrambling" 3GPP TSG-RAN WG1 Meeting 90bis R1-1717059, Oct. 2, 2017 pp. 1-3.
Ericsson. "Further Details on Scrambling" 3GPP TSG-RAN WG1 Meeting #89 R1-1708940, May 7, 2017 p. 1.
Office Action for the Korean Patent Application No. 10-2020-7016824, dated May 3, 2021, 6 pages.
Office Action for Chinese Application No. 201711147202.9, dated Mar. 2, 2021, 8 pages.
Search Report for Chinese Application No. 2017111472029, dated Feb. 22, 2021, 2 pages.
European Search Report and Written Opinion for the European Patent Application No. 18879345, dated Jul. 16, 2021, 9 pages.
Notice of the Second Examination Opinion for CN 201711147202.9, dated Sep. 17, 2021.
Supplemental Search Report for CN 2017111472029, dated Sep. 3, 2021.
Notice of Reasons for Refusal for JP 2020-527734, dated Jul. 27, 2021.

* cited by examiner

… (1)

METHODS AND DEVICES FOR SCRAMBLING AND DESCRAMBLING SIGNAL, AND STORAGE MEDIUM

CROSS-REFERENCES TO RELATED APPLICATIONS

This is a National stage application, filed under 37 U.S.C. 371, of International Patent Application NO. PCT/CN2018/098937, filed on Aug. 6, 2018, which is based on and claims priority to a Chinese patent application No. 201711147202.9 filed on Nov. 17, 2017, disclosures of which are incorporated herein by reference in their entireties.

TECHNICAL FIELD

The present disclosure relates to the field of communication and, in particular, to a method and apparatus for scrambling a signal, a method and apparatus for descrambling a signal, a device for scrambling or descrambling a signal, and a storage medium.

BACKGROUND

With the start of the fifth generation mobile communication, single-station multi-beam and multi-station multi-beam co-transmission become the core of the next generation wireless communication system. Meanwhile, coexistence of the traditional Enhance Mobile Broadband (eMBB) service and other Internet of Things (IoT) related services (e.g., Ultra Reliable & Low Latency Communication (URLLC)) is also a bright point for the 5th Generation (5G) communication.

However, the above features also present a new adjustment to the randomization of the interference between the transmission signals. Specifically, the cell identity (ID) is increased due to the dense station deployment in view of the limited high frequency coverage. At the same time, due to the need for simultaneous access of multiple types of User Equipments (UE), the scrambling sequence generation method based on the traditional UE and cell ID imposes strict requirements on the length of the selected sequence itself. In addition, considering the non-ideal characteristics of different channels in single-station/multi-station/multi-beam co-transmission, the interference between groups of layers in multi-layer transmission is increased. How to solve these problems effectively and improve the spectrum efficiency of the current system becomes an urgent problem.

For the problem in the related art that an increase in the interference between the transmission signals cannot be effectively inhibited by the traditional method for scrambling the signals between the transmission nodes, no solution has yet been proposed.

SUMMARY

Embodiments of the present disclosure provide a method and apparatus for scrambling a signal, a method and apparatus for descrambling a signal, a device for scrambling or descrambling a signal, and a storage medium.

An embodiment of the present disclosure provides a method for scrambling a signal. The method includes the steps described below.

A first transmission node determines first parameters for scrambling a signal to be transmitted or a signal group to be transmitted.

The first transmission node scrambles the signal or the signal group according to the first parameters.

The first transmission node sends the scrambled signal or the scrambled signal group to a second transmission node, and notifies part or all of the first parameters to the second transmission node through first signaling.

Another embodiment of the present disclosure further provides a method for descrambling a signal. The method includes the steps described below.

A first transmission node notifies part or all of first parameters to a second transmission node through third signaling, where the first parameters are used for scrambling a signal to be transmitted or a signal group to be transmitted by the second transmission node.

The first transmission node receives the scrambled signal or the scrambled signal group sent by the second transmission node.

The first transmission node descrambles, according to the first parameters, the scrambled signal or the scrambled signal group sent by the second transmission node.

Another embodiment of the present disclosure further provides a method for descrambling a signal. The method includes the steps described below.

A second transmission node receives a scrambled signal or a scrambled signal group according to first parameters and sent by a first transmission node, and receives part or all of the first parameters sent by the first transmission node through first signaling.

The second transmission node descrambles the received scrambled signal or the received scrambled signal group according to the first parameters.

In another aspect, an embodiment of the present disclosure further provides a method for scrambling a signal. The method includes the steps described below.

A second transmission node receives part or all of first parameters sent by a first transmission node through third signaling.

The second transmission node scrambles a signal to be transmitted or a signal group to be transmitted according to the first parameters.

The second transmission node sends the scrambled signal or the scrambled signal group to the first transmission node.

Another embodiment of the present disclosure further provides an apparatus for scrambling a signal. The apparatus is applied to a first transmission node and includes a determination module, a first scrambling module and a first sending module.

The determination module is configured to determine first parameters for scrambling a signal to be transmitted or a signal group to be transmitted.

The first scrambling module is configured to scramble the signal or the signal group according to the first parameters.

The first sending module is configured to send the scrambled signal or the scrambled signal group to a second transmission node, and notify part or all of the first parameters to the second transmission node through first signaling.

Another embodiment of the present disclosure further provides an apparatus for descrambling a signal. The apparatus is applied to a first transmission node and includes a notification module, a first receiving module and a first descrambling module.

The notification module is configured to notify part or all of first parameters to a second transmission node through third signaling, where the first parameters are used for scrambling a signal to be transmitted or a signal group to be transmitted by the second transmission node.

The first receiving module is configured to receive the scrambled signal or the scrambled signal group sent by the second transmission node.

The first descrambling module is configured to descramble, according to the first parameters, the scrambled signal or the scrambled signal group sent by the second transmission node.

Another embodiment of the present disclosure further provides an apparatus for descrambling a signal. The apparatus is applied to a second transmission node and includes a second receiving module and a second descrambling module.

The second receiving module is configured to receive a scrambled signal or a scrambled signal group according to first parameters and sent by a first transmission node, and receive part or all of the first parameters sent by the first transmission node through first signaling.

The second descrambling module is configured to descramble the received scrambled signal or the received scrambled signal group according to the first parameters.

Another embodiment of the present disclosure further provides an apparatus for scrambling a signal. The apparatus is applied to a second transmission node and includes a third receiving module, a second scrambling module and a second sending module.

The third receiving module is configured to receive part or all of first parameters sent by a first transmission node through third signaling.

The second scrambling module is configured to scramble a signal to be transmitted or a signal group to be transmitted according to the first parameters.

The second sending module is configured to send the scrambled signal or the scrambled signal group to the first transmission node.

Another embodiment of the present disclosure further provides a storage medium. The storage medium includes a stored program which, when executed, performs the method of any one of the embodiments described above.

Another embodiment of the present disclosure further provides a device for scrambling or descrambling a signal. The device includes a memory and a processor. The memory is configured to store a computer program executable on the processor and the processor is configured to implement the method when the program is executed by the processor.

According to the embodiments of the present disclosure, the parameters used for scrambling the signal are sent by the transmission nodes through signaling, so a transmission node scrambles the data to be transmitted or descrambles the received scrambled data according to the currently determined parameters, solving the problem in the related art that an increase in the interference between the transmission signals cannot be effectively inhibited by the traditional method for scrambling the signal between the transmission nodes, reducing the interference between the transmission signals, and improving the user experience.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not form improper limits to the present disclosure. In the drawings.

DETAILED DESCRIPTION

Hereinafter the present disclosure will be described in detail with reference to the drawings in conjunction with the embodiments. It is to be noted that if not in collision, the embodiments and features therein in the present disclosure may be combined with each other.

It is to be noted that the terms "first", "second" and the like in the description, claims and drawings of the present disclosure are used to distinguish between similar objects and are not necessarily used to describe a particular order or sequence.

Embodiment One

Figure 1:
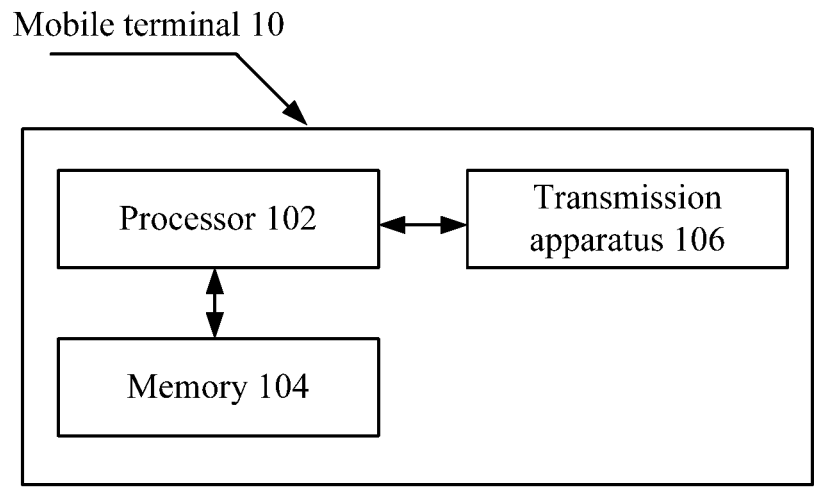
FIG. 1 is a block diagram of a hardware structure of a mobile terminal for implementing a method for scrambling a signal according to an embodiment of the present disclosure.

A method embodiment provided by embodiment one of the present application may be executed in a mobile terminal, a computer terminal or other similar computing apparatuses. Taking the method to be executed in the mobile terminal as an example, FIG. 1 is a block diagram of a hardware structure of a mobile terminal for implementing a method for scrambling a signal according to an embodiment of the present disclosure. As shown in FIG. 1, a mobile terminal 10 may include one or more (merely one is shown in FIG. 1) processors 102 (the processor 102 may include, but is not limited to, a processing apparatus such as a microcontroller unit (MCU) and a field programmable gate array (FPGA)), a memory 104 used for storing data, and a transmission apparatus 106 used for implementing a communication function. It may be understood by those skilled in the art that the structure shown in FIG. 1 is merely illustrative, and not intended to limit the structure of the electronic apparatus described above. For example, the mobile terminal 10 may further include more or fewer components than the components shown in FIG. 1, or may have a configuration different from the configuration shown in FIG. 1.

The memory 104 may be configured to store software programs and modules of application software, such as program instructions/modules corresponding to the data transmission method in the embodiments of the present disclosure. The one or more processors 102 execute the software programs and modules stored in the memory 104 to perform various functional applications and data processing, that is, to implement the method described above. The memory 104 may include a high-speed random access memory, and may further include a nonvolatile memory such as one or two magnetic storage apparatuses, flash memories or other nonvolatile solid-state memories. In some examples, the memory 104 may further include memories that are disposed remote from the one or more processors 102. These remote memories may be connected to the mobile terminal 10 via a network. Examples of the above network include, but are not limited to, the Internet, an intranet, a local area network, a mobile communication network and a combination thereof.

The transmission apparatus 106 is configured to receive or send data via a network. Specific examples of the above network may include a wireless network provided by a communication provider of the mobile terminal 10. In one example, the transmission apparatus 106 includes a network interface controller (NIC), which may be connected to other network devices via a base station and thus is capable of communicating with the Internet. In one example, the transmission apparatus 106 may be a radio frequency (RF) module, which is used for communicating with the Internet in a wireless way.

Figure 2:
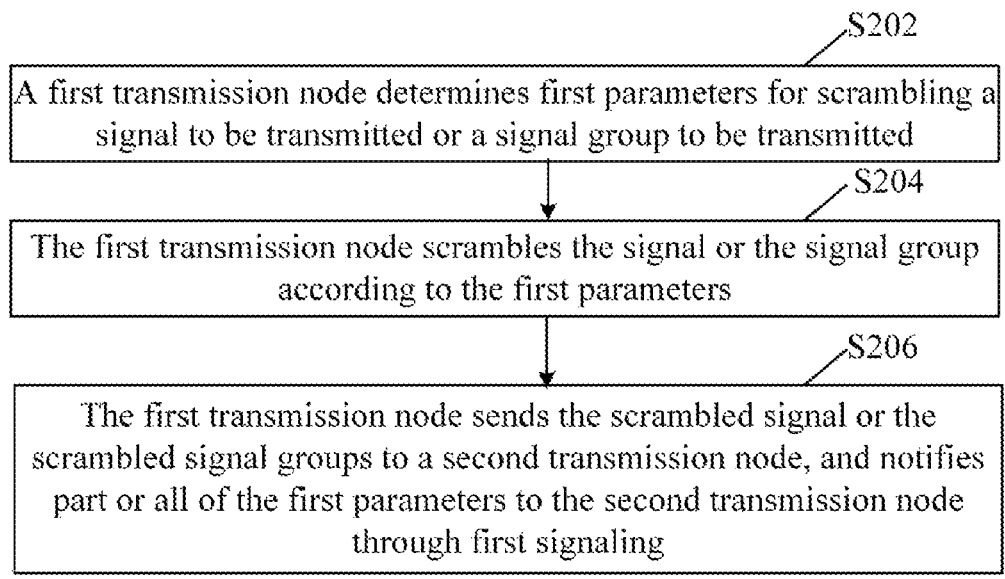
FIG. 2 is flowchart one of a method for scrambling a signal according to an embodiment of the present disclosure.

Based on the above mobile terminal, an embodiment of the present disclosure provides a method for scrambling a signal. FIG. 2 is flowchart one of a method for scrambling a signal according to an embodiment of the present disclosure. As shown in FIG. 2, the method includes the steps described below.

In step S202, a first transmission node determines first parameters for scrambling a signal to be transmitted or a signal group to be transmitted.

In step S204, the first transmission node scrambles the signal or the signal group according to the first parameters.

In step S206, the first transmission node sends the scrambled signal or the scrambled signal group to a second transmission node, and notifies part or all of the first parameters to the second transmission node through first signaling.

In other embodiments, the step in which the first transmission node scrambles the signal or the signal group according to the first parameters includes that: the first transmission node generates, according to the first parameters, a sequence for scrambling the signal or the signal group, and scrambles the signal or the signal group according to the generated sequence.

In other embodiments, before the first transmission node determines the first parameters for scrambling the signal group to be transmitted, the method further includes that: the first transmission node divides the signal into X signal groups according to a first rule, where X is an integer greater than or equal to 1.

In other embodiments, the first rule includes at least one of the following.

Division is performed according to a transmission layer corresponding to the signal. In other embodiments, in a layer mapping process, data mapped to the same layer is divided into a group. In other embodiments, signals in the same group share one layer (or data flow) index, and the index is used when the scrambling code is generated.

Division is performed according to a demodulation reference signal corresponding to the signal. In other embodiments, signals corresponding to the same demodulation reference signal resource (including the time domain/frequency domain/code domain/port) are divided into a group. In other embodiments, signals in the same group share one demodulation reference signal resource (including the time domain/frequency domain/code domain/port) index, and the index is used when the scrambling code is generated. In other embodiments, signals corresponding to the same demodulation reference signal resource group (including the time domain/frequency domain/code domain/port group) are divided into a group. In other embodiments, the code domain may be a frequency domain orthogonal code, a frequency domain orthogonal code, or a combination thereof. In other embodiments, division of demodulation reference signal resource groups may be in accordance with notification from the high-layer signaling. In other embodiments, optionally, division of demodulation reference signal resource groups may be in accordance with a relationship agreed upon by the base station and the terminal. In other embodiments, signals in the same group share one demodulation reference signal resource group (including the time domain/frequency domain/code domain/port group) index, and the index is used when the scrambling code is generated.

Division is performed according to a quasi co-location (QCL) relationship corresponding to the signal. In other embodiments, when a quasi co-location relationship exists between demodulation reference signals of the signal to be transmitted, the signals may be grouped.

Division is performed according to a beam corresponding to the signals. In other embodiments, when the to-be-sent signals are sent by the same analog or digital or analog-digital hybrid beam, the signals may be grouped. In other embodiments, signals in the same group share one analog or digital or analog-digital hybrid beam index, and the index is used when the scrambling code is generated.

Division is performed according to a phase tracking reference signal (PTRS) resource associated with the signal. In other embodiments, when corresponding to the same phase tracking reference signal resource (including the time domain/frequency domain/code domain/port), the signals may be grouped. In other embodiments, signals in the same group share one phase tracking reference signal resource (including the time domain/frequency domain/code domain/port) index, and the index is used when the scrambling code is generated.

Division is performed according to a code block (CB)/a code block group (CBG)/a transmission block (TB)/a code word (CW) index included in the signal. In other embodiments, when the signals originate from the same code block/transmission block/code block group/code word, the signals are grouped. In other embodiments, signals in the same group share one code block/transmission block/code block group/code word index, and the index is used when the scrambling code is generated.

Division is performed according to a time unit index occupied by the signal. In other embodiments, when the signals occupy the same time domain resource, the signals are grouped. In other embodiments, the time domain resource may be a time unit index occupied by the signal itself. In other embodiments, signals in the same group share one time domain resource index, and the index is used when the scrambling code is generated.

Division is performed according to a frequency domain resource occupied by the signal. In other embodiments, when the signals occupy the same time domain and frequency domain resource, the signals are grouped. In other embodiments, signals in the same group share one frequency domain resource index, and the index is used when the scrambling code is generated.

Division is performed according to a code domain resource occupied by the signal. In other embodiments, when the to-be-sent signals occupy the same code domain resource, the signals are grouped. In other embodiments, signals in the same group share one code domain resource index, and the index is used when the scrambling code is generated.

In other embodiments, the first transmission node determines the first rule through one of following manners.

Determination is performed according to a rule agreed upon by the first transmission node and the second transmission node.

Determination is performed according to feedback information of the second transmission node.

Determination is performed according to known information of the first transmission node and the feedback information of the second transmission node.

Determination is performed according to the known information of the first transmission node.

In other embodiments, in a case where the first signaling indicates part of the first parameters, where one piece of first signaling indicates one first parameter or a plurality of first parameters, the remaining first parameters are determined according to a rule agreed upon by the first transmission node and the second transmission node; or the remaining first parameters are known information of the second transmission node; or the remaining first parameters are feedback information of the second transmission node; or sending of the first signaling is closed by second signaling.

In other embodiments, the method further includes: in a case where one of the following conditions is satisfied, the first signaling is enabled through one of the following manners: the first signaling is enabled according to a rule agreed upon by the first transmission node and the second transmission node; or sending of the first signaling is enabled by second signaling.

In other embodiments, the second signaling includes at least one of: a radio resource control (RRC) signaling, Media Access Control (MAC), single-level physical layer signaling, or a multi-level physical layer signaling.

In other embodiments, the signal includes one of: physical signal carrying broadcast information, physical signal carrying data information, physical signal carrying control information, or a reference signal.

In other embodiments, the first parameters include: a cell identification index, a user identification index, a user grouping index, a code word index, a code block, a code block group, a scrambling code sequence characteristic parameter, a time unit index, a reference signal resource mark index, a reference signal port index, a reference signal port grouping index and a frequency domain resource index.

In other embodiments, the first signaling includes at least one of: RRC signaling, MAC, single-level physical layer signaling, or multi-level physical layer signaling.

Embodiment Two

Figure 3:
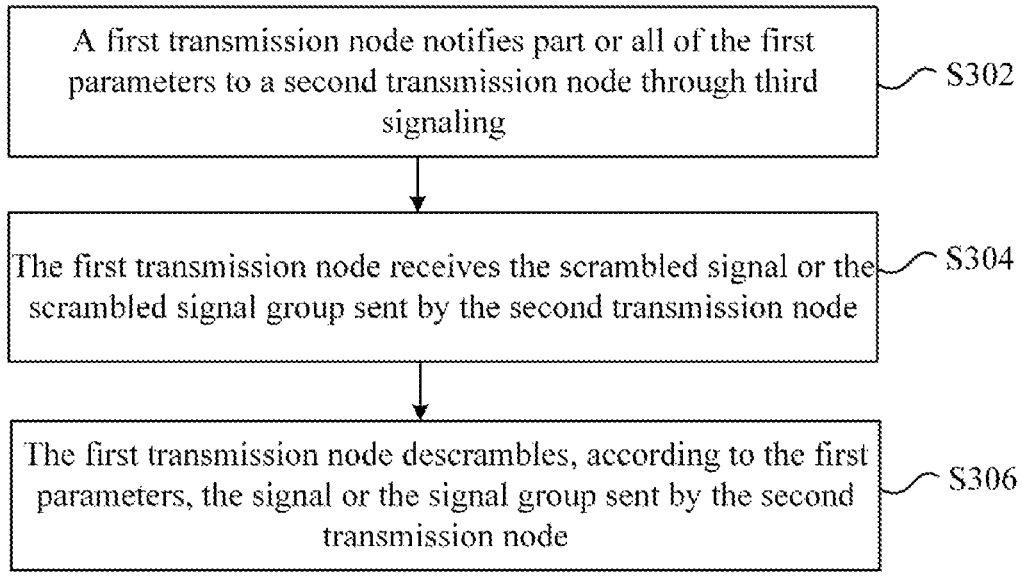
FIG. 3 is flowchart one of a method for descrambling a signal according to an embodiment of the present disclosure.

Another embodiment of the present disclosure further provides a method for descrambling a signal. FIG. 3 is flowchart one of a method for descrambling a signal according to an embodiment of the present disclosure. As shown in FIG. 3, the method includes steps described below.

In step S302, a first transmission node notifies part or all of the first parameters to a second transmission node through third signaling, where the first parameters are used for scrambling a signal to be transmitted or a signal group to be transmitted by the second transmission node.

In step S304, the first transmission node receives the scrambled signal or the scrambled signal group sent by the second transmission node.

In step S306, the first transmission node descrambles, according to the first parameters, the scrambled signal or the scrambled signal group sent by the second transmission node.

In other embodiments, the step in which the first transmission node descrambles, according to the first parameters, the signal or the signal group sent by the second transmission node includes that: the first transmission node generates, according to the first parameters, a sequence for descrambling the signal or the signal group sent by the second transmission node, and descrambles the signal or the signal group according to the generated sequence.

In other embodiments, the signal group is Y signal groups which are obtained through a division operation of the signal by the second transmission node according to a first rule, where Y is an integer greater than or equal to 1.

In other embodiments, the first rule includes at least one of the following.

Division is performed according to a transmission layer corresponding to the signal.

Division is performed according to a demodulation reference signal corresponding to the signal.

Division is performed according to a QCL relationship corresponding to the signal.

Division is performed according to a beam corresponding to the signal.

Division is performed according to a PTRS resource associated with the signal.

Division is performed according to CB/CBG/TB index included in the signal.

Division is performed according to a time unit index occupied by the signal.

Division is performed according to a frequency domain resource occupied by the signal.

Division is performed according to a code domain resource occupied by the signal.

In other embodiments, in a case where the third signaling indicates the part of the first parameters, one piece of third signaling indicates one first parameter or a plurality of first parameters, the remaining first parameters are determined according to a rule agreed upon by the first transmission node and the second transmission node; or the remaining first parameters are known information of the second transmission node; or the remaining first parameters are feedback information of the second transmission node; or sending of the third signaling is closed by fourth signaling.

In other embodiments, the method further includes: in a case where one of the following conditions is satisfied, the third signaling is enabled through one of the following manners: the first transmission node is enabled according to a rule agreed upon by the first transmission node and the second transmission node; or sending of the third signaling is enabled by fourth signaling.

In other embodiments, the fourth signaling includes at least one of: RRC signaling, MAC, single-level physical layer signaling, or multi-level physical layer signaling.

In other embodiments, the signal includes one of: physical signal carrying broadcast information, physical signal carrying data information, physical signal carrying control information, or a reference signal.

In other embodiments, the first parameters include: a cell identification index, a user identification index, a user grouping index, a code word index, a code block, a code block group, a scrambling code sequence characteristic parameter, a time unit index, a reference signal resource mark index, a reference signal port index, a reference signal port grouping index and a frequency domain resource index.

In other embodiments, the third signaling includes at least one of: RRC signaling, MAC, single-level physical layer signaling, or multi-level physical layer signaling.

Embodiment Three

Figure 4:
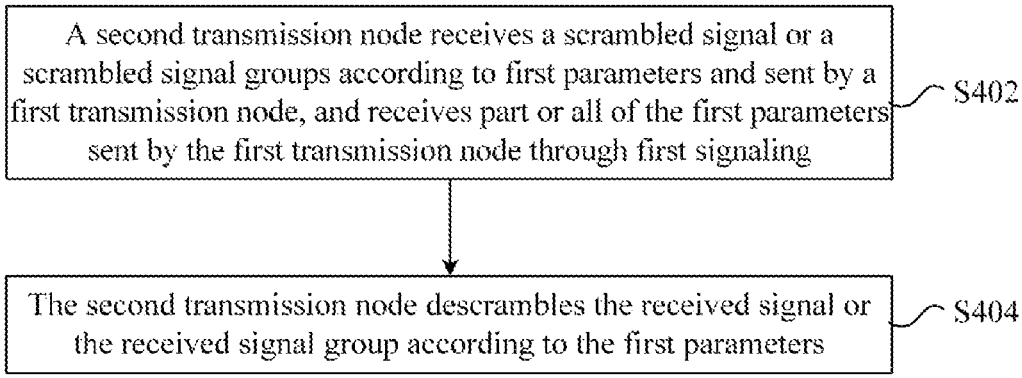
FIG. 4 is flowchart two of a method for descrambling a signal according to an embodiment of the present disclosure.

Another embodiment of the present disclosure further provides a method for descrambling a signal. FIG. 4 is flowchart two of a method for descrambling a signal according to an embodiment of the present disclosure. As shown in FIG. 4, the method includes steps described below.

In step S402, a second transmission node receives a scrambled signal or a scrambled signal group according to first parameters and sent by a first transmission node, and receives part or all of the first parameters sent by the first transmission node through first signaling.

In step S404, the second transmission node descrambles the received signal or the received signal group according to the first parameters.

In other embodiments, the step in which the second transmission node descrambles the received signal or the received signal group according to the first parameters includes that: the second transmission node generates, according to the first parameters, a sequence for descrambling the received signal or the received signal group, and descrambles the signal or the signal group according to the generated sequence.

In other embodiments, the signal group is X signal groups which are obtained through a division operation of the signal by the first transmission node according to a first rule, where X is an integer greater than or equal to 1.

In other embodiments, the first rule includes at least one of the following.

Division is performed according to a transmission layer corresponding to the signal.

Division is performed according to a demodulation reference signal corresponding to the signal.

Division is performed according to a QCL relationship corresponding to the signal.

Division is performed according to a beam corresponding to the signal.

Division is performed according to a PTRS resource associated with the signal.

Division is performed according to CB/CBG/TB index included in the signal.

Division is performed according to a time unit index occupied by the signal.

Division is performed according to a frequency domain resource occupied by the signal.

Division is performed according to a code domain resource occupied by the signal.

In other embodiments, the method further includes that: the second transmission node determines, according to received second signaling, whether the first transmission node sends the first signaling.

In other embodiments, the second signaling includes at least one of: RRC signaling, MAC, single-level physical layer signaling, or multi-level physical layer signaling.

In other embodiments, the method further includes that: in a case where the first signaling indicates the part of the first parameters, the second transmission node determines the remaining first parameters through one of the following manners, where one piece of first signaling indicates one first parameter or a plurality of first parameters.

Determination is performed by the second transmission node according to a rule agreed upon by the second transmission node and the first transmission node.

Determination is performed by the second transmission node according to a measurement result of the signals sent by the first transmission node.

Determination is performed by the second transmission node according to feedback information of the second transmission node.

Determination is performed by the second transmission node according to a device parameter.

Determination is performed by the second transmission node according to feedback information of the first transmission node.

In other embodiments, the signal includes one of: physical signal carrying broadcast information, physical signal carrying data information, physical signal carrying control information, or a reference signal.

In other embodiments, the first parameters include: a cell identification index, a user identification index, a user grouping index, a code word index, a code block, a code block group, a scrambling code sequence characteristic parameter, a time unit index, a reference signal resource mark index, a reference signal port index, a reference signal port grouping index and a frequency domain resource index.

In other embodiments, the first signaling includes at least one of: RRC signaling, MAC, single-level physical layer signaling, or multi-level physical layer signaling.

Embodiment Four

Figure 5:
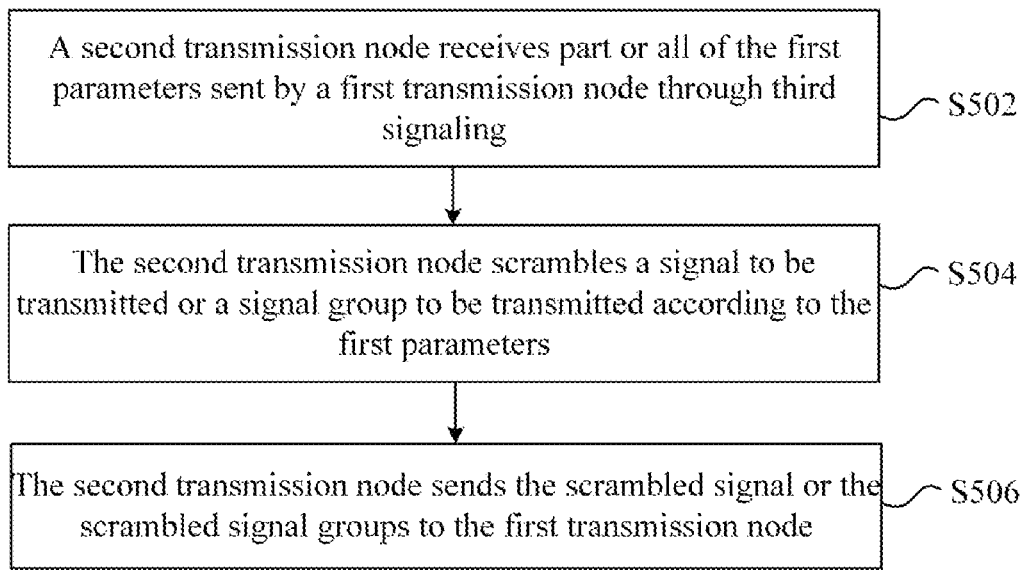
FIG. 5 is flowchart two of a method for scrambling a signal according to an embodiment of the present disclosure.

In another aspect, an embodiment of the present disclosure further provides a method for scrambling a signal. FIG. 5 is flowchart two of a method for scrambling a signal according to an embodiment of the present disclosure. As shown in FIG. 5, the method includes steps described below.

In step S502, a second transmission node receives part or all of the first parameters sent by a first transmission node through third signaling.

In step S504, the second transmission node scrambles a signal to be transmitted or a signal group to be transmitted according to the first parameters.

In step S506, the second transmission node sends the scrambled signal or the scrambled signal group to the first transmission node.

In other embodiments, the step in which the second transmission node scrambles the signal or the signal group according to the first parameters includes that: the second transmission node generates, according to the first parameters, a sequence for scrambling the signal or the signal group, and scrambles the signal or the signal group according to the generated sequence.

In other embodiments, the method further includes that: the second transmission node divides the signal into Y signal groups according to a first rule, where Y is an integer greater than or equal to 1.

In other embodiments, the first rule includes at least one of the following.

Division is performed according to a transmission layer corresponding to the signal.

Division is performed according to a demodulation reference signal corresponding to the signal.

Division is performed according to a QCL relationship corresponding to the signal.

Division is performed according to a beam corresponding to the signal.

Division is performed according to a PTRS resource associated with the signal.

Division is performed according to CB/CBG/TB index included in the signal.

Division is performed according to a time unit index occupied by the signal.

Division is performed according to a frequency domain resource occupied by the signal.

Division is performed according to a code domain resource occupied by the signal.

In other embodiments, the method further includes that: the second transmission node determines the first rule through one of the following manners: performing determination according to a rule agreed upon by the first transmission node and the second transmission node; performing determination according to measurement of the second transmission node; or performing determination according to an X-th piece of signaling sent by the first transmission node.

In other embodiments, the method further includes that: the second transmission node determines, according to received fourth signaling, whether the first transmission node sends the third signaling.

In other embodiments, the fourth signaling includes at least one of: RRC signaling, MAC, single-level physical layer signaling, or multi-level physical layer signaling.

In other embodiments, the method further includes a step described below.

In a case where the third signaling indicates the part of the first parameters, the second transmission node determines the remaining first parameters through one of the following manners, where one piece of third signaling indicates one first parameter or a plurality of first parameters.

Determination is performed by the second transmission node according to a rule agreed upon by the second transmission node and the first transmission node.

Determination is performed by the second transmission node according to a measurement result of the signals sent by the first transmission node.

Determination is performed by the second transmission node according to a device parameter.

Determination is performed by the second transmission node according to feedback information of the first transmission node.

In other embodiments, the signal includes one of: physical signal carrying broadcast information, physical signal carrying data information, physical signal carrying control information, or a reference signal.

In other embodiments, the first parameters include: a cell identification index, a user identification index, a user grouping index, a code word index, a code block, a code block group, a scrambling code sequence characteristic parameter, a time unit index, a reference signal resource mark index, a reference signal port index, a reference signal port grouping index and a frequency domain resource index.

In other embodiments, the first signaling includes at least one of: RRC signaling, MAC, single-level physical layer signaling, or multi-level physical layer signaling.

An embodiment of the present disclosure provides a method and device for scrambling/descrambling a signal/a signal group between transmission nodes. The method and device includes that a base station completes scrambling of downlink the signal/the signal group to be transmitted and notifies, through the signaling, a terminal of the parameters currently used for scrambling.

In other embodiments, the base station may group a downlink signal.

In other embodiments, the base station may actively send the signaling according to a scheduling requirement.

In other embodiments, the base station may send the signaling after receiving a request sent by the terminal.

In other embodiments, the base station may self-determine parameters that need to be notified through the signaling.

In other embodiments, the base station may notify, according to signaling, the terminal of whether to send the signaling to notify the terminal of parameters currently used for scrambling.

In other embodiments, the terminal may confirm, according to the received signaling, whether the base station sends the signaling notifying the terminal of parameters currently used for scrambling.

In other embodiments, the terminal may determine, according to the received signaling, parameters for descrambling the currently received signals/signal groups.

In other embodiments, the terminal may determine, according to a rule agreed upon by the terminal and the base station, parameters for descrambling the current signal/signal group.

In other embodiments, the terminal may perform calculation through the determined parameters to obtain the scrambling sequence.

In other embodiments, the terminal may complete descrambling of the received signal/signal group through the scrambling sequence obtained from calculation.

An embodiment of the present disclosure further provides a method and device for scrambling/descrambling a signal/a signal group between transmission nodes. The method and device includes that a base station notifies, through the signaling, a terminal of parameters currently used for scrambling an uplink signal, and that the terminal generates a scrambling sequence through the determined parameters to complete scrambling of the uplink signal.

In other embodiments, the base station may actively send the signaling according to a scheduling requirement.

In other embodiments, the base station may send the signaling after receiving a request sent by the terminal.

In other embodiments, the base station may self-determine parameters that need to be notified through the signaling.

In other embodiments, the base station may notify, according to signaling, the terminal of whether to send the signaling to notify the terminal of parameters currently used for scrambling.

In other embodiments, the terminal may group the uplink signal.

In other embodiments, the terminal may confirm, according to the received signaling, whether the base station sends the signaling notifying the terminal of parameters currently used for scrambling.

In other embodiments, the terminal may determine, according to the received signaling, parameters for scrambling the currently signal/signal group to be transmitted.

In other embodiments, the terminal may determine, according to a rule agreed upon by the terminal and the base station, parameters for scrambling the currently signal/signal group to be transmitted.

In other embodiments, the terminal may perform calculation through the determined parameters to obtain the scrambling sequence.

In other embodiments, the terminal may complete scrambling of the signal to be transmitted through the scrambling sequence obtained from calculation.

With the embodiment of the present disclosure, since the base station sends parameters for scrambling signal to the terminal through the signaling, the base station/terminal may scramble the data to be transmitted or descramble the received data according to the currently determined parameters.

In the embodiment of the present disclosure, the measurement may include the receiving of a measurement signal, the sending of a measurement signal and the feedback of a measurement result.

The reference signal resource index may be an index of a time domain/frequency domain/code domain or a combination of the above parameters occupied by a reference signal.

The reference signal port grouping index refers to indexes used for distinguishing between different groups after reference signal ports involved in transmission are grouped according to a specific reference signal port grouping rule.

The reference signal port grouping rule may be: grouping according to a quasi co-location relationship (QCL) of a reference signal; grouping according to high-layer signaling configuration; grouping according to resources occupied by each port of a reference signal.

The device parameter may be: radio frequency link identification, the index of radio frequency links, radio frequency link phase noise, power amplification, an antenna array element characteristic, an antenna array characteristic, an antenna sub-array, a time offset, a frequency offset and the like. The device parameter also includes calibration information of the above parameters.

The scrambling code sequence characteristic parameter may be: a sequence type, a sequence length, an initialization parameter, a polynomial coefficient and the like.

A beam may be a resource (such as precoding at a sending end, precoding at a receiving end, an antenna port, an antenna weight vector and an antenna weight matrix). A beam symbol may be replaced with a resource index because the beam may be bound to some time-frequency code resources for transmission. The beam may also be a transmission (sending/receiving) mode. The transmission mode may include space division multiplexing, frequency-domain/time-domain diversity or the like.

A beam may be a resource (such as precoding at a sending end, precoding at a receiving end, an antenna port, an antenna weight vector and an antenna weight matrix). A beam symbol may be replaced with a resource index because the beam may be bound to some time-frequency code resources for transmission. The beam may also be a transmission (sending/receiving) mode. The transmission mode may include space division multiplexing, frequency-domain/time-domain diversity or the like.

The quasi co-location (QCL) relationship of the reference signal refers to a quasi co-location assumption satisfied by resources (such as time domains and frequency domains) and antenna ports used in receiving and sending the reference signal. Different quasi co-location assumptions at least correspond to the following parameters or parameter subsets: Doppler spread, Doppler shift, delay spread, average delay and average gain, and may also include spatial parameter information, such as an angle of arrival, a spatial correlation of the receive beam, the average delay and a time-frequency channel response correlation (including phase information).

The first transmission node or the second transmission node in the embodiments of the present disclosure may be a base station, a terminal, a transmission node, a relay and the like.

Hereinafter the present disclosure will be described in detail with reference to the drawings in conjunction with the embodiments. It is to be noted that if not in collision, the embodiments and features therein in the present disclosure may be combined with each other.

It is to be noted that the terms "first", "second" and the like in the description, claims and above drawings of the present disclosure are used to distinguish between similar objects and are not necessarily used to describe a particular order or sequence.

Example One

Figure 6:
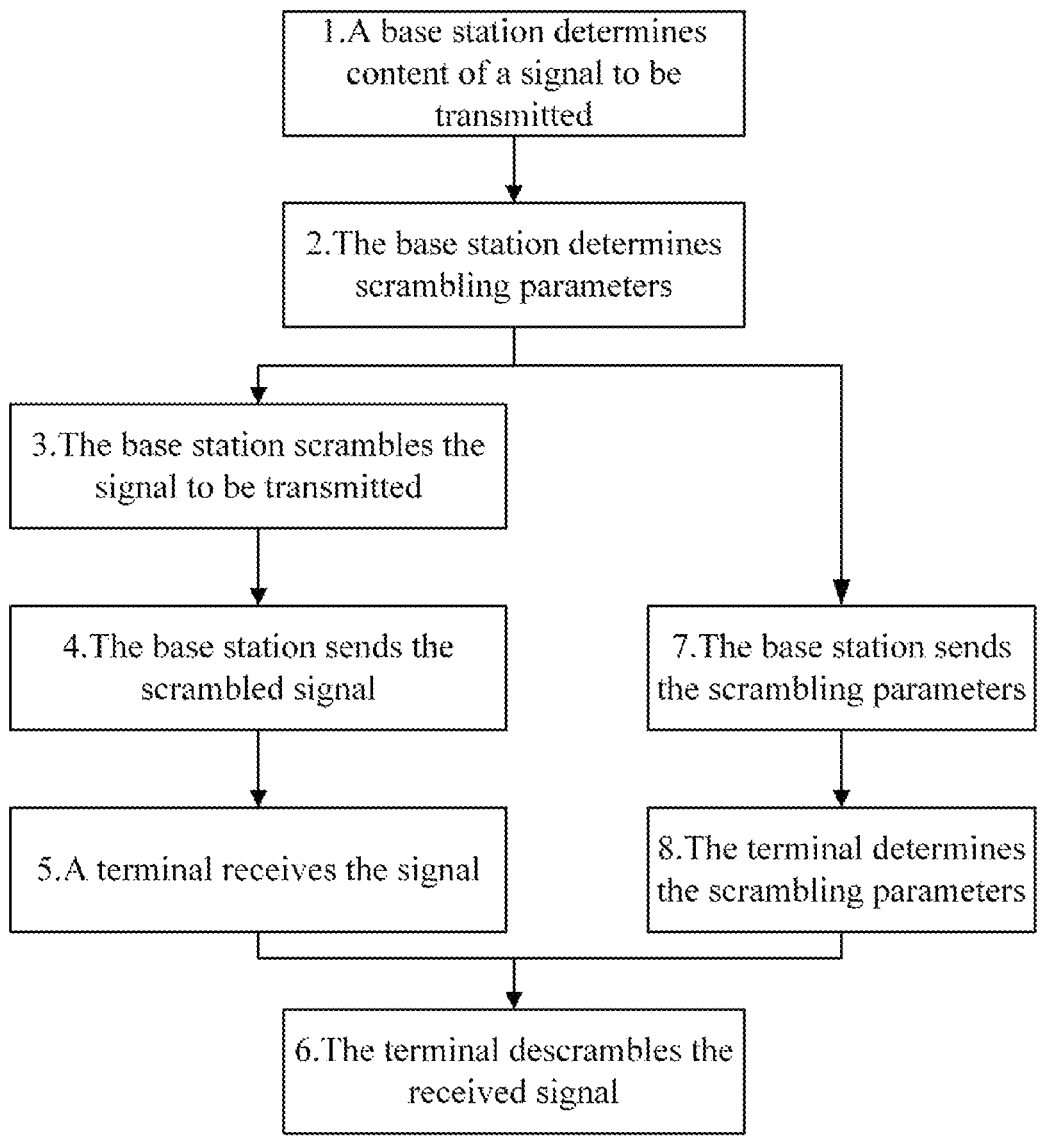
FIG. 6 is flowchart one of scrambling/descrambling signals between communication nodes according to an embodiment of the present disclosure.

This embodiment provides a method for scrambling/descrambling a signal between communication nodes. FIG. 6 is flowchart one of scrambling/descrambling a signal between communication nodes according to an embodiment of the present disclosure. As shown in FIG. 6, the method includes steps described below.

In step 1, a base station determines content of a signal to be transmitted.

In step 2, the base station determines scrambling parameters.

In step 3, the base station scrambles the signal.

In step 4, the base station sends the scrambled signal and sends the parameters for scrambling.

In step 5, a terminal receives the signals sent by the base station and determines the scrambling parameters.

In step 6, the terminal descrambles the received signal.

In other embodiments, the signal to be transmitted determined by the base station in this embodiment may be one of: physical signal carrying broadcast information, physical signal carrying data information, physical signal carrying control information, or a reference signal.

In this embodiment, a scrambling parameter determined by the base station includes one of: a cell identification index, a user identification index, a user grouping index, a code word index, a code block, a code block group, a scrambling code sequence characteristic parameter, a time unit index, a reference signal resource mark index, a reference signal port index, a reference signal port grouping index, or a frequency domain resource index.

In other embodiments, the user identification index may be one of: a user network identification index or a user cell identification index.

In other embodiments, the cell identification index may be one of: a physical cell index or a virtual cell index.

In other embodiments, the time unit index may be one of the following: an index of a symbol/slot/subframe/frame occupied by the signal in transmission by taking a current carrier spacing as the reference, an index of a symbol/slot/subframe/frame occupied by the signal in transmission by taking a specified reference carrier spacing as the reference, or an index of a symbol/slot/subframe/frame occupied by the signal in transmission by taking a specified index of a reference signal starting symbol/slot/subframe/frame as the reference.

In other embodiments, when a reference carrier spacing is specified, the index of the symbol/slot/subframe/frame used for scrambling the i-th signal can be calculated by the following formula: $\hat{n}_i = \lceil n_i \cdot SCS_i/SCS_{ref} \rceil$ or $\hat{n}_i = n_i \cdot \lceil SCS_i/SCS_{ref} \rceil$, where $n_i$ and $SCS_i$ denote the index of the occupied symbol/slot/subframe/frame when the self-carrier spacing of the i-th signal is taken as the reference and the self-carrier spacing of the i-th signal, respectively. $SCS_{ref}$ is the specified reference carrier spacing.

In other embodiments, when a reference carrier spacing is specified, the index of the symbol/slot/subframe/frame used for scrambling the i-th signal can be calculated by the following formula: $\hat{n}_i = \lceil n_i/L \rceil$, where $n_i$ denotes the index of the occupied symbol/slot/subframe/frame when the self-carrier spacing of the i-th signal is taken as the reference and the self-carrier spacing of the i-th signal. L is the ratio of the specified self-reference carrier spacing of the i-th signal to the reference carrier spacing.

In other embodiments, when a reference carrier spacing is specified and a ratio of the self-carrier spacing of the i-th signal and the reference carrier spacing is the H-th power of G (G is a non-zero positive integer), the index of the symbol/slot/subframe/frame used for scrambling the i-th signal can be calculated by the following formula: $\hat{n}_i = \lceil n_i/G^{(N_i - M_{ref})} \rceil$, where $n_i$ denotes the index of the occupied symbol/slot/subframe/frame when the self-carrier spacing of the i-th signal is taken as the reference and the self-carrier spacing of the i-th signal. $N_i$ denotes a subcarrier index of the i-th signal, and $M_{ref}$ is the specified reference carrier index.

In other embodiments, when the specified index of a reference signal starting symbol/slot/subframe/frame is taken as the reference, the index of the symbol/slot/subframe/frame used for scrambling the i-th signal can be calculated by the following formula: $\hat{n}_i = n_i + n_{ref}$, where $n_i$ denotes the index of the occupied symbol/slot/subframe/frame when the self-carrier spacing of the i-th signal is taken as the reference and the self-carrier spacing of the i-th signal.

$n_{ref}$ is the specified index of the symbol/slot/subframe/frame occupied by the reference signal.

In other embodiments, the index of the symbol/slot/subframe/frame occupied by the reference signal taken as the reference may be the index of the starting/ending symbol/slot/subframe/frame occupied by the reference signal.

In other embodiments, a starting position of the index of a symbol/slot/subframe/frame may be one of: a time unit index currently occupied by the signal in actual transmission or a specified time unit index.

In other embodiments, the frequency domain resource index may be one of: a carrier index, a sub-band index, or a bandwidth part (BWP) index.

In other embodiments, the reference signal may be one of: a synchronization signal, a channel measurement reference signal, a demodulation reference signal, or a phase noise compensation reference signal.

In other embodiments, the parameter used by the base station to scramble a physical signal carrying broadcast information includes at least one of the following combinations: {cell identification index} or {cell identification index, time unit index}.

In other embodiments, the parameter used by the base station to scramble a reference signal includes at least one of the following combinations: {cell identification index}, {cell identification index, reference signal resource index}, {cell identification index, reference signal port index}, or {reference signal port grouping index}.

In other embodiments, the parameters used by the base station to scramble the physical signal carrying data information include at least one of the following combinations: {cell identification index, user identification index, code word index}, {user identification index, code word index, demodulation reference signal port grouping index}, {user identification index, code word index, demodulation reference signal port index}, {user identification index, time unit index, demodulation reference signal port grouping index}, or {user identification index, time unit index, code block group, demodulation reference signal port grouping index}.

In this embodiment, the base station may send all or part of the scrambling parameters by using the signaling.

Optionally, the base station does not need to perform the indication through the signaling when the parameters required by scrambling meets one of the following conditions: performing determination according to a rule agreed upon by a receiving end and a sending end; the parameter being known information of the terminal, where the known information may be scheduling information; the parameter being a feedback result of the terminal; or the parameter being a device parameter of the terminal.

In other embodiments, the terminal may acquire the demodulation signal port grouping index or port index according to the demodulation reference signal port/port indication information assigned by the base station.

In other embodiments, whether the base station sends the above signaling may be controlled by other signaling.

In other embodiments, the method further includes sending, by the base station, the scrambling parameter in step 7, where the scrambling parameter required to be sent by the base station may be one of: {user identification index, cell identification index}, {user identification index, demodulation reference signal port grouping index}, or {demodulation reference signal port grouping index}.

In other embodiments, the method further includes determining, by the terminal, the scrambling parameter, and generating, by the terminal, an initialization value of the scrambling sequence according to the determined scrambling parameter in step 8.

In other embodiments, the terminal generates a scrambling sequence according to the determined scrambling parameter and descrambles the received signal.

In other embodiments, the terminal descrambles the received signal according to the determined scrambling parameter.

Example Two

Figure 7:
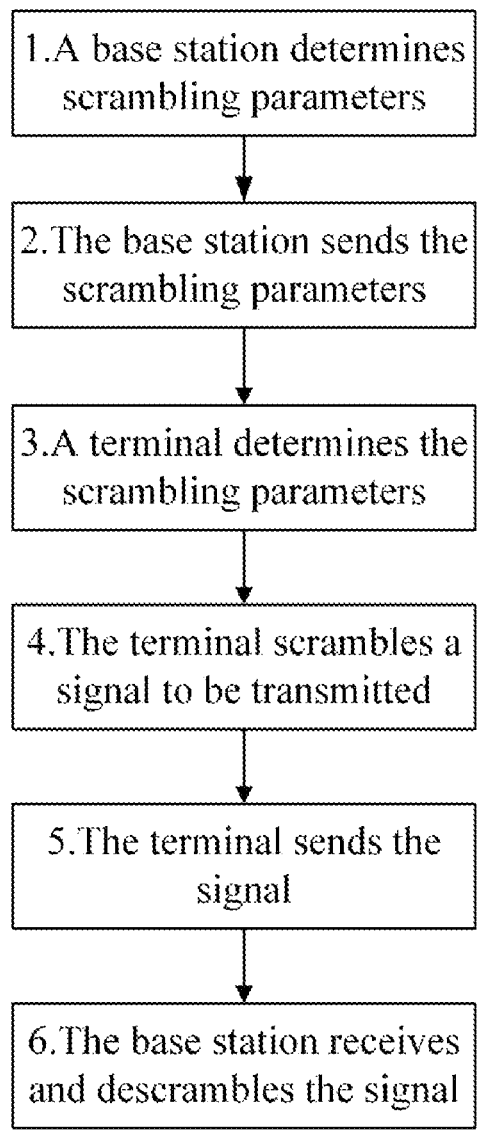
FIG. 7 is flowchart two of scrambling/descrambling signals between communication nodes according to an embodiment of the present disclosure.

This embodiment provides a method for scrambling/descrambling a signal between communication nodes. FIG. 7 is flowchart two of scrambling/descrambling a signal between communication nodes according to an embodiment of the present disclosure. As shown in FIG. 7, the method includes steps described below.

In step 1, a base station determines scrambling parameters.

In step 2, the base station sends the scrambling parameters.

In step 3, a terminal determines the scrambling parameters.

In step 4, the terminal scrambles a signal to be transmitted.

In step 5, the terminal sends the scrambled signal.

In step 6, the base station receives and descrambles the scrambled signal.

In this embodiment, a sent signal determined by the base station in this embodiment may be one of: physical signal carrying broadcast information, physical signal carrying data information, physical signal carrying control information, or a reference signal.

In this embodiment, a scrambling parameter determined by the base station includes one of: a cell identification index, a user identification index, a user grouping index, a code word index, a code block, a code block group, a scrambling code sequence characteristic parameter, a time unit index, a reference signal resource mark index, a reference signal port index, a reference signal port grouping index, or a frequency domain resource index.

The user identification index may be one of: a user network identification index or a user cell identification index.

The cell identification index may be one of: a physical cell index or a virtual cell index.

In other embodiments, the time unit index may be one of the following: an index of a symbol/slot/subframe/frame occupied by the signal in transmission by taking a current carrier spacing as the reference, an index of a symbol/slot/subframe/frame occupied by the signal in transmission by taking a specified reference carrier spacing as the reference, or an index of a symbol/slot/subframe/frame occupied by the signal in transmission by taking a specified index of a reference signal starting symbol/slot/subframe/frame as the reference.

In other embodiments, when a reference carrier spacing is specified, the index of the symbol/slot/subframe/frame used for scrambling the i-th signal can be calculated by the following formula: $\hat{n}_i = \lceil n_i \cdot SCS_i / SCS_{ref} \rceil$ or $\hat{n}_i = n_i \cdot \lceil SCS_i / SCS_{ref} \rceil$, where $n_i$ and $SCS_i$ denote the index of the occupied symbol/slot/subframe/frame when the self-carrier spacing of the i-th signal is taken as the reference and the self-carrier spacing of the i-th signal, respectively. $SCS_{ref}$ is the specified reference carrier spacing. In signal transmission, the specified index of the symbol/slot/subframe/frame occupied by the reference signal is taken as the reference for the index of the occupied symbol/slot/subframe/frame occupied by a reference signal.

In other embodiments, when a reference carrier spacing is specified, the index of the symbol/slot/subframe/frame used for scrambling the i-th signal can be calculated by the following formula: $\hat{n}_i = \lceil n_i / L \rceil$, where $n_i$ denotes the index of the occupied symbol/slot/subframe/frame when the self-carrier spacing of the i-th signal is taken as the reference and the self-carrier spacing of the i-th signal. L is the ratio of the specified self-reference carrier spacing of the i-th signal to the reference carrier spacing.

In other embodiments, when a reference carrier spacing is specified and a ratio of the self-carrier spacing of the i-th signal and the reference carrier spacing is the H-th power of G (G is a non-zero positive integer), the index of the symbol/slot/subframe/frame used for scrambling the i-th signal can be calculated by the following formula: $\hat{n}_i = \lceil n_i / G^{(N_i - M_{ref})} \rceil$, where $n_i$ denotes the index of the occupied symbol/slot/subframe/frame when the self-carrier spacing of the i-th signal is taken as the reference and the self-carrier spacing of the i-th signal. $N_i$ is a subcarrier index of the i-th signal, and $M_{ref}$ is the specified reference carrier index.

In other embodiments, when the specified index of a reference signal starting symbol/slot/subframe/frame is taken as the reference, the index of the symbol/slot/subframe/frame used for scrambling the i-th signal can be calculated by the following formula: $\hat{n}_i + n_i + n_{ref}$, where $n_i$ denotes the index of the occupied symbol/slot/subframe/frame when the self-carrier spacing of the i-th signal is taken as the reference and the self-carrier spacing of the i-th signal. $n_{ref}$ is the specified index of the symbol/slot/subframe/frame occupied by the reference signal.

In other embodiments, the index of the symbol/slot/subframe/frame occupied by the reference signal taken as the reference may be the index of the starting/ending symbol/slot/subframe/frame occupied by the reference signal.

In other embodiments, a starting position of the index of a symbol/slot/subframe/frame may be one of: the time unit index currently occupied by the signal in actual transmission or a specified time unit index.

In other embodiments, the frequency domain resource index may be one of: a carrier index, a sub-band index, or a bandwidth part (BWP) index.

In other embodiments, the reference signal may be one of: a synchronization signal, a channel measurement reference signal, a demodulation reference signal, or a phase noise compensation reference signal.

In other embodiments, the parameter used by the base station to scramble a reference signal includes at least one of the following combinations: {cell identification index}, {cell identification index, reference signal resource index}, {cell identification index, reference signal port index}, or {reference signal port grouping index}.

In other embodiments, the terminal may acquire the demodulation signal port grouping index or port index according to the demodulation reference signal port/port indication information assigned by the base station.

In other embodiments, the parameters used by the base station to scramble the physical signal carrying data information include at least one of the following combinations: {cell identification index, user identification index, code word index}, {user identification index, code word index, demodulation reference signal port grouping index}, {user identification index, code word index, demodulation reference signal port index}, {user identification index, time unit index, demodulation reference signal port grouping index}, or {user identification index, time unit index, code block group, demodulation reference signal port grouping index}.

In this embodiment, the base station may send all or part of the scrambling parameters by using the signaling.

In other embodiments, the base station does not need to perform the indication through the signaling when the parameters required by scrambling meets one of the following conditions: performing determination according to a rule agreed upon by a receiving end and a sending end; the parameter being known information of the terminal; the parameter being a feedback result of the terminal; or the parameter being a device parameter of the terminal.

In other embodiments, whether the base station sends the above signaling may be controlled by other signaling.

In other embodiments, the terminal generates an initialization value of the scrambling sequence according to the determined scrambling parameter; in other embodiments, the terminal generates a scrambling sequence according to the determined scrambling parameter and scrambles the to-be-sent signal.

Optionally, the terminal scrambles the signal according to the determined scrambling parameter.

Example Three

Figure 8:
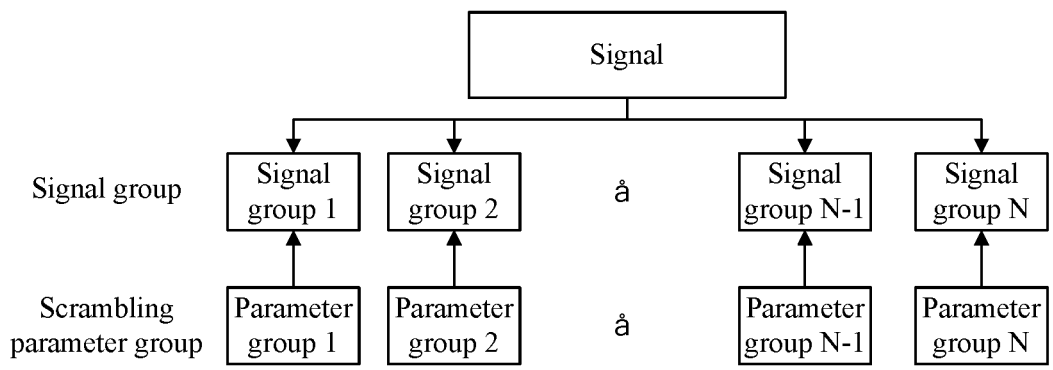
FIG. 8 is a flowchart of grouping and scrambling signals between communication nodes according to an embodiment of the present disclosure.

This embodiment provides a method for grouping and scrambling signals between communication nodes. FIG. 8 is a flowchart of grouping and scrambling a signal between communication nodes according to an embodiment of the present disclosure. As shown in FIG. 8, the method includes steps described below.

In step 1, a transmission node groups a signal according to a rule.

In step 2, scrambling parameters are determined for each signal group.

In this embodiment, a sending signal determined by the base station in this embodiment may be one of: physical signal carrying broadcast information, physical signal carrying data information, physical signal carrying control information, or a reference signal.

In this embodiment, the rule for grouping the signal includes at least one of the following: performing division according to a transmission layer corresponding to the signal; performing division according to a demodulation reference signal corresponding to the signal; performing division according to a QCL relationship corresponding to the signal; performing division according to a beam corresponding to the signal; performing division according to a PTRS resource associated with the signal; performing division according to CB/CBG/TB index included in the signal; performing division according to a time unit index occupied by the signal; performing division according to a frequency domain resource occupied by the signal; or performing division according to a code domain resource occupied by the signal.

In this embodiment, a determined scrambling parameter includes one of: a cell identification index, a user identification index, a user grouping index, a code word index, a code block, a code block group, a scrambling code sequence characteristic parameter, a time unit index, a reference signal resource mark index, a reference signal port index, a reference signal port grouping index, or a frequency domain resource index.

In other embodiments, the user identification index may be one of: a user network identification index or a user cell identification index.

In other embodiments, the cell identification index may be one of: a physical cell index or a virtual cell index.

In other embodiments, the time unit index may be one of the following: an index of a symbol/slot/subframe/frame occupied by the signal in transmission by taking a current carrier spacing as the reference, an index of a symbol/slot/subframe/frame occupied by the signal in transmission by taking a specified reference carrier spacing as the reference, or an index of a symbol/slot/subframe/frame occupied by the signal in transmission by taking a specified index of a reference signal starting symbol/slot/subframe/frame as the reference. In signal transmission, the specified index of the symbol/slot/subframe/frame occupied by the reference signal is taken as the reference for the index of the occupied symbol/slot/subframe/frame occupied by a reference signal.

In other embodiments, when a reference carrier spacing is specified, the index of symbol/slot/subframe/frame used for scrambling the i-th signal can be calculated by the following formula: $\hat{n}_i = \lceil n_i \cdot SCS_i/SCS_{ref} \rceil$ or $\hat{n}_i = n_i \cdot \lceil SCS_i/SCS_{ref} \rceil$, where $n_i$ and $SCS_i$ denote the index of the occupied symbol/slot/subframe/frame when the self-carrier spacing of the i-th signal is taken as the reference and the self-carrier spacing of the i-th signal, respectively. $SCS_{ref}$ is the specified reference carrier spacing.

In other embodiments, when a reference carrier spacing is specified, the index of the symbol/slot/subframe/frame used for scrambling the i-th signal can be calculated by the following formula: $\hat{n}_i = \lceil n_i/L \rceil$, where $n_i$ denotes the index of the occupied symbol/slot/subframe/frame when the self-carrier spacing of the i-th signal is taken as the reference and the self-carrier spacing of the i-th signal. L is the ratio of the specified self-reference carrier spacing of the i-th signal to the reference carrier spacing.

In other embodiments, when a reference carrier spacing is specified and a ratio of the self-carrier spacing of the i-th signal and the reference carrier spacing is the H-th power of G (G is a non-zero positive integer), the index of the symbol/slot/subframe/frame used for scrambling the i-th signal can be calculated by the following formula: $\hat{n}_i = \lceil n_i/G^{(N_i - M_{ref})} \rceil$, where $n_i$ denotes the index of the occupied symbol/slot/subframe/frame when the self-carrier spacing of the i-th signal is taken as the reference and the self-carrier spacing of the i-th signal. $N_i$ is a subcarrier index of the i-th signal, and $M_{ref}$ is the specified reference carrier index.

When the specified index of a reference signal starting symbol/slot/subframe/frame is taken as the reference, the index of the symbol/slot/subframe/frame used for scrambling the i-th signal can be calculated by the following formula: $\hat{n}_i = n_i + n_{ref}$, where $n_i$ denotes the index of the occupied symbol/slot/subframe/frame when the self-carrier spacing of the i-th signal is taken as the reference and the self-carrier spacing of the i-th signal. $n_{ref}$ is the specified index of the symbol/slot/subframe/frame occupied by the reference signal.

In other embodiments, the index of the symbol/slot/subframe/frame occupied by the reference signal taken as the reference may be the index of the starting/ending symbol/slot/subframe/frame occupied by the reference signal.

In other embodiments, a starting position of the index of a symbol/slot/subframe/frame may be one of: a time unit index currently occupied by the signal in actual transmission or a specified time unit index.

In other embodiments, the reference signal may be one of: a synchronization signal, a channel measurement reference signal, a demodulation reference signal, or a phase noise compensation reference signal.

In other embodiments, when the signal grouping rule is performing division according to transmission layers corresponding to the signals, the scrambling parameter at least includes the reference signal port index.

In other embodiments, the terminal may acquire the demodulation signal port grouping index or port index according to the demodulation reference signal port/port indication information assigned by the base station.

In other embodiments, the scrambling parameter at least includes the reference signal port grouping index when the signal grouping rule is one of the following: performing division according to demodulation reference signals corresponding to the signals, performing division according to QCL relationships corresponding to the signals, or performing division according to beams corresponding to the signals.

In other embodiments, when the signal grouping rule is performing division according to CB/CBG/TB indexes included in the signals, the scrambling parameter at least includes one of: a codeword index, a codeblock or a codeblock group.

In other embodiments, when the signal grouping rule is performing division according to time unit indexes occupied by the signals, the scrambling parameter at least includes the time unit index.

In other embodiments, when the signal grouping rule is performing division according to a frequency domain resource occupied by the signal, the scrambling parameter at least includes the frequency domain resource index.

In other embodiments, multiple signal groups may share one of the following parameters: a cell identification index or a user identification index.

Embodiment Five

Figure 9:
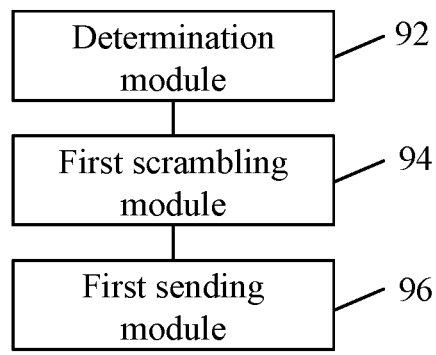
FIG. 9 is block diagram one of an apparatus for scrambling a signal according to an embodiment of the present disclosure.

Another embodiment of the present disclosure further provides an apparatus for scrambling a signal. FIG. 9 is block diagram one of an apparatus for scrambling a signal according to an embodiment of the present disclosure. As shown in FIG. 9, the apparatus includes a determination module 92, a first scrambling module 94 and a first sending module 96.

The determination module 92 is configured to determine first parameters for scrambling a signal to be transmitted or a signal group to be transmitted.

The first scrambling module 94 is configured to scramble the signal or the signal group according to the first parameters.

The first sending module 96 is configured to send the scrambled signal or the scrambled signal group to a second transmission node, and notify part or all of the first parameters to the second transmission node through first signaling.

Embodiment Six

Figure 10:
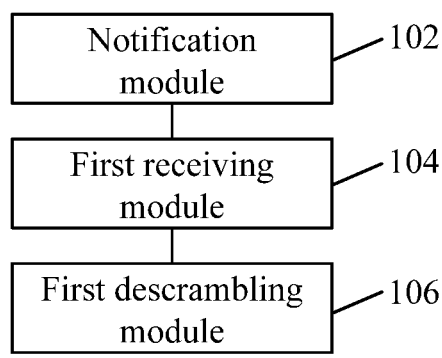
FIG. 10 is block diagram one of an apparatus for descrambling a signal according to an embodiment of the present disclosure.

Another embodiment of the present disclosure further provides an apparatus for descrambling a signal. The apparatus is applied to a first transmission node. FIG. 10 is block diagram one of an apparatus for descrambling a signal according to an embodiment of the present disclosure. As shown in FIG. 10, the apparatus includes a notification module 102, a first receiving module 104 and a first descrambling module 106.

The notification module 102 is configured to notify part or all of the first parameters to a second transmission node through third signaling, where the first parameters are used for scrambling a signal to be transmitted or a signal group to be transmitted by the second transmission node.

The first receiving module 104 is configured to receive the scrambled signal or the scrambled signal group sent by the second transmission node.

The first descrambling module 106 is configured to descramble, according to the first parameters, the scrambled signal or the scrambled signal group sent by the second transmission node.

Embodiment Seven

Figure 11:
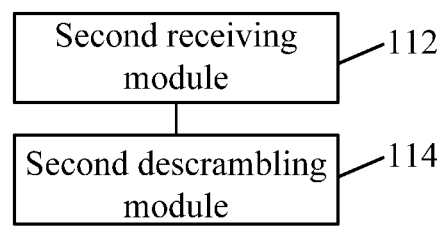
FIG. 11 is block diagram two of an apparatus for descrambling a signal according to an embodiment of the present disclosure.

Another embodiment of the present disclosure further provides an apparatus for descrambling a signal. The apparatus is applied to a second transmission node. FIG. 11 is block diagram two of an apparatus for descrambling a signal according to an embodiment of the present disclosure. As shown in FIG. 11, the apparatus includes a second receiving module 112 and a second descrambling module 114.

The second receiving module 112 is configured to receive a scrambled signal or a scrambled signal group according to first parameters and sent by a first transmission node, and receive part or all of the first parameters sent by the first transmission node through first signaling.

The second descrambling module 114 is configured to descramble the received scrambled signal or the received scrambled signal group according to the first parameters.

Embodiment Eight

Figure 12:
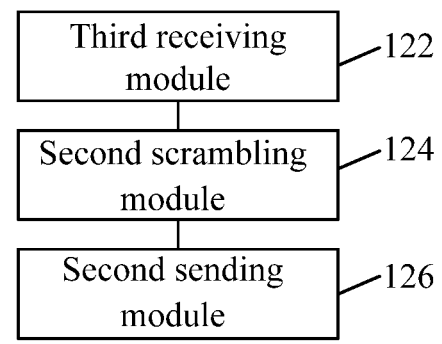
FIG. 12 is block diagram two of an apparatus for scrambling a signal according to an embodiment of the present disclosure.

Another embodiment of the present disclosure further provides an apparatus for scrambling a signal. The apparatus is applied to a second transmission node. FIG. 12 is block diagram two of an apparatus for scrambling a signal according to an embodiment of the present disclosure. As shown in FIG. 12, the apparatus includes a third receiving module 122, a second scrambling module 124 and a second sending module 126.

The third receiving module 122 is configured to receive part or all of the first parameters sent by a first transmission node through third signaling.

The second scrambling module 124 is configured to scramble a signal to be transmitted or a signal group to be transmitted according to the first parameters.

The second sending module 126 is configured to send the scrambled signal or the scrambled signal group to the first transmission node.

Embodiment Nine

An embodiment of the present disclosure further provides a storage medium. The storage medium includes a stored program which, when executed, executes the method of any one of the embodiments described above.

In other embodiments, the storage medium may be configured to store a program code for executing the steps described below.

In S11, a first transmission node determines first parameters for scrambling a signal to be transmitted or a signal group to be transmitted.

In S12, the first transmission node scrambles the signal or the signal group according to the first parameters.

In S13, the first transmission node sends the scrambled signal or the scrambled signal group to a second transmission node, and notifies part or all of the first parameters to the second transmission node through first signaling.

In other embodiments, the storage medium may also be configured to store a program code for executing the steps described below.

In S21, a first transmission node notifies part or all of the first parameters to a second transmission node through third signaling, where the first parameters are used for scrambling a signal to be transmitted or a signal group to be transmitted by the second transmission node.

In S22, the first transmission node receives the scrambled signal or the scrambled signal group sent by the second transmission node.

In S23, the first transmission node descrambles, according to the first parameters, the signal or signal group sent by the second transmission node.

In other embodiments, the storage medium may also be configured to store a program code for executing the steps described below.

In S31, a second transmission node receives a scrambled signal or a scrambled signal group according to first parameters and sent by a first transmission node, and receives part or all of the first parameters sent by the first transmission node through first signaling.

In S32, the second transmission node descrambles the received scrambled signal or the received scrambled signal group according to the first parameters.

In other embodiments, the storage medium may also be configured to store a program code for executing the steps described below.

In S41, a second transmission node receives part or all of the first parameters sent by a first transmission node through third signaling.

In S42, the second transmission node scrambles a signal to be transmitted or a signal group to be transmitted according to the first parameters.

In S43, the second transmission node sends the scrambled signal or the scrambled signal group to the first transmission node.

In this embodiment, the above storage medium may include, but is not limited to, a USB flash disk, a read-only memory (ROM), a random access memory (RAM), a mobile hard disk, a magnetic disk, an optical disk or another medium capable of storing program codes.

Embodiment Ten

An embodiment of the present disclosure further provides a processor. The processor is configured to execute a program which, when executed, executes the steps in the method of any one of the embodiments described above.

In other embodiments, the program described above is configured to execute the steps described below.

In S51, a first transmission node determines first parameters for scrambling a signal to be transmitted or a signal group to be transmitted.

In S52, the first transmission node scrambles the signal or the signal group according to the first parameters.

In S53, the first transmission node sends the scrambled signal or the scrambled signal group to a second transmission node, and notifies part or all of the first parameters to the second transmission node through first signaling.

In other embodiments, the program described above is also configured to execute the steps described below.

In S61, a first transmission node notifies part or all of the first parameters to a second transmission node through third signaling, where the first parameters are used for scrambling a signal to be transmitted or a signal group to be transmitted by the second transmission node.

In S62, the first transmission node receives the scrambled signal or the scrambled signal group sent by the second transmission node.

In S63, the first transmission node descrambles, according to the first parameters, the signal or the signal group sent by the second transmission node.

In other embodiments, the program described above is also configured to execute the steps described below.

In S71, a second transmission node receives a scrambled signal or a scrambled signal group according to first parameters and sent by a first transmission node, and receives part or all of the first parameters sent by the first transmission node through first signaling.

In S72, the second transmission node descrambles the received scrambled signal or the received scrambled signal group according to the first parameters.

In other embodiments, the program described above is also configured to execute the steps described below.

In S81, a second transmission node receives part or all of the first parameters sent by a first transmission node through third signaling.

In S82, the second transmission node scrambles a signal to be transmitted or a signal group to be transmitted according to the first parameters.

In S83, the second transmission node sends the scrambled signal or the scrambled signal group to the first transmission node.

Optionally, for specific examples in this embodiment, reference may be made to the examples described in the above embodiments and optional implementations, and repetition is not made in this embodiment.

An embodiment of the present disclosure further provides a device for scrambling or descrambling a signal. The device includes a memory and a processor. The memory is configured to store a computer program executable on the processor and the processor is configured to implement the method when the program is executed by the processor.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present disclosure. Moreover, various functional units may all be integrated in one processing unit, or each unit may be used as a separate unit, or two or more units may be integrated into one unit. The integrated functional unit may be implemented by hardware or may be implemented by hardware plus a software functional unit.

It may be understood by those skilled in the art that all or part of the steps in the method embodiments described above may be implemented by hardware related to program instructions, these programs may be stored in a computer-readable storage medium, and when executed, these programs execute steps including the method embodiments described above; and the preceding storage medium includes various media capable of storing program codes, such as a removable storage device, a read-only memory, a magnetic disk or an optical disk. Alternatively, the above-mentioned integrated unit of the present disclosure may also be stored in the computer-readable storage medium if implemented in the form of a software functional module and sold or used as an independent product. Based on this understanding, the technical solutions provided by the embodiments of the present disclosure substantially, or the part contributing to the existing art, may be embodied in the form of a software product. The computer software product is stored in a storage medium and includes several instructions for enabling a computer device (which may be a personal computer, a server or a network device, etc.) to perform all or part of the method provided by each embodiment of the present disclosure. The preceding storage medium includes various media capable of storing program codes, such as a removable storage device, a ROM, a magnetic disk or an optical disk.

The above are only embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

What is claimed is:

1. A method for scrambling a signal, comprising:
dividing, by the first transmission node, a signal to be transmitted into X signal groups according to a first rule, wherein X is an integer greater than or equal to 2;
determining, by a first transmission node, a respective one of first parameters for scrambling each of the X signal groups;
scrambling, by the first transmission node, each of the X signal groups according to the respective one of the first parameters; and
sending, by the first transmission node, the scrambled X signal groups to a second transmission node, and notifying part or all of the first parameters to the second transmission node through first signaling;

wherein the first rule comprises at least one of:

performing division according to a transmission layer corresponding to the signal;

performing division according to a demodulation reference signal corresponding to the signal;

performing division according to a quasi co-location (QCL) relationship corresponding to the signal;

performing division according to a beam corresponding to the signal;

performing division according to a phase tracking reference signal (PTRS) resource associated with the signal;

performing division according to a code block (CB), a code block group (CBG), a transmission block (TB), or a code word (CW) index comprised in the signal;

performing division according to a time unit index occupied by the signal;

performing division according to a frequency domain resource occupied by the signal; or performing division according to a code domain resource occupied by the signal.

2. The method of claim 1, wherein scrambling, by the first transmission node, each of the X signal groups according to the respective one of the first parameters comprises:

generating, by the first transmission node according to the first parameters, a respective one of sequences for scrambling each of the X signal groups; and scrambling each of the X signal groups according to the generated respective one of sequences.

3. The method of claim 1, wherein the first transmission node determines the first rule through one of following manners:

determining the first rule according to a rule agreed upon by the first transmission node and the second transmission node;

determining the first rule according to feedback information of the second transmission node;

determining the first rule according to known information of the first transmission node and feedback information of the second transmission node; or determining the first rule according to known information of the first transmission node.

4. The method of claim 1, wherein in a case where the first signaling indicates the part of the first parameters, one piece of first signaling indicates one parameter or a plurality of first parameters, remaining first parameters are determined according to a rule agreed upon by the first transmission node and the second transmission node; or remaining first parameters are known information of the second transmission node; or remaining first parameters are feedback information of the second transmission node; or whether the first signaling is sent is controlled by second signaling.

5. The method of claim 1, further comprising: in a case where one of following conditions is satisfied, the first signaling is enabled through one of following manners:

the first signaling is enabled according to a rule agreed upon by the first transmission node and the second transmission node; or whether the first signaling is sent is controlled by second signaling.

6. The method of claim 1, wherein the signal comprises one of:

physical signal carrying broadcast information, physical signal carrying data information, physical signal carrying control information, or a reference signal.

7. The method of claim 1, wherein the first parameters comprise:

a cell identification index, a user identification index, a user grouping index, a code word index, a code block, a code block group, a scrambling code sequence characteristic parameter, a time unit index, a reference signal resource mark index, a reference signal port index, a reference signal port grouping index and a frequency domain resource index.

8. A non-transitory storage medium, comprising a stored program, wherein when the program is executed, the method of claim 1 is performed.

9. A device for scrambling or descrambling a signal, comprising a memory and a processor, wherein the memory is configured to store a computer program executable on the processor and the processor is configured to implement the method of claim 1 when the program is executed by the processor.

10. A method for descrambling a signal, comprising:

receiving, by a second transmission node from a first transmission node, a scrambled signal group which is scrambled according to first parameters, and receiving part or all of the first parameters sent by the first transmission node through first signaling; and descrambling, by the second transmission node, the received scrambled signal group according to the part or all of the first parameters;

wherein the signal group is X signal groups which are obtained through a division operation of the signal by the first transmission node according to a first rule, wherein X is an integer greater than or equal to 2;

wherein the first rule comprises at least one of:

a division operation is performed according to a transmission layer corresponding to the signal;

a division operation is performed according to a demodulation reference signal corresponding to the signal;

a division operation is performed according to a quasi co-location (QCL) relationship corresponding to the signal;

a division operation is performed according to a beam corresponding to the signal;

a division operation is performed according to a phase tracking reference signal (PTRS) resource associated with the signal;

a division operation is performed according to a code block (CB), a code block group (CBG), a transmission block (TB), or a code word (CW) index comprised in the signal;

a division operation is performed according to a time unit index occupied by the signal;

a division operation is performed according to a frequency domain resource occupied by the signal; or a division operation is performed according to a code domain resource occupied by the signal.

11. The method of claim 10, wherein descrambling, by the second transmission node, the received scrambled signal or the received scrambled signal group according to the part or all of the first parameters comprises:

generating, by the second transmission node according to the part or all of the first parameters, a sequence for descrambling the received scrambled signal group; and descrambling the received scrambled signal group according to the generated sequence.

12. The method of claim 10, further comprising: determining, by the second transmission node according to received second signaling, whether the first transmission node sends the first signaling.

13. The method of claim 10, further comprising: in a case where the first signaling indicates the part of the first parameters, determining, by the second transmission node, remaining first parameters through one of following manners, wherein one piece of first signaling indicates one first parameter or a plurality of first parameters:
   determining, by the second transmission node, the remaining first parameters according to a rule agreed upon by the second transmission node and the first transmission node;
   determining, by the second transmission node, the remaining first parameters according to a measurement result of the signals sent by the first transmission node;
   determining, by the second transmission node, the remaining first parameters according to feedback information of the second transmission node;
   determining, by the second transmission node, the remaining first parameters according to a device parameter; or
   determining, by the second transmission node, the remaining first parameters according to feedback information of the first transmission node.

14. An apparatus for descrambling a signal, applied to a second transmission node and comprising a processor and a memory for storing execution instructions that when executed by the processor cause the processor to perform the method of claim 10.

15. A non-transitory storage medium, comprising a stored program, wherein when the program is executed, the method of claim 10 is performed.

16. A device for scrambling and descrambling a signal, comprising a memory and a processor, wherein the memory is configured to store a computer program executable on the processor and the processor is configured to implement the method of claim 10 when the program is executed by the processor.

17. An apparatus for scrambling a signal, applied to a first transmission node and comprising a processor and a memory for storing execution instructions that when executed by the processor cause the processor to perform steps in following modules:
   a dividing module, which is configured to divide a signal to be transmitted into X signal groups according to a first rule, wherein X is an integer greater than or equal to 2;
   a determination module, which is configured to determine a respective one of first parameters for scrambling each of the X signal groups;
   a first scrambling module, which is configured to scramble each of the X signal groups according to the respective one of the first parameters; and
   a first sending module, which is configured to send the scrambled X signal groups to a second transmission node, and notify part or all of the first parameters to the second transmission node through first signaling;
wherein the first rule comprises at least one of:
performing division according to a transmission layer corresponding to the signal;
performing division according to a demodulation reference signal corresponding to the signal;
performing division according to a quasi co-location (QCL) relationship corresponding to the signal;
performing division according to a beam corresponding to the signal;
performing division according to a phase tracking reference signal (PTRS) resource associated with the signal;
performing division according to a code block (CB), a code block group (CBG), a transmission block (TB), or a code word (CW) index comprised in the signal;
performing division according to a time unit index occupied by the signal;
performing division according to a frequency domain resource occupied by the signal; or
performing division according to a code domain resource occupied by the signal.

\* \* \* \* \*